United States Patent
Hua et al.

(10) Patent No.: US 10,757,149 B2
(45) Date of Patent: Aug. 25, 2020

(54) USAGE AUTHORIZATION CONTROL FOR GROUP COMMUNICATIONS IN A COMMUNICATION NETWORK

(71) Applicant: Alcatel-Lucent USA Inc., Murray Hill, NJ (US)

(72) Inventors: Suzann Hua, Lisle, IL (US); Yigang Cai, Naperville, IL (US)

(73) Assignee: Nokia of America Corporation, Murray Hill, NJ (US)

( * ) Notice: Subject to any disclaimer, the term of this patent is extended or adjusted under 35 U.S.C. 154(b) by 1015 days.

(21) Appl. No.: 14/563,006

(22) Filed: Dec. 8, 2014

(65) Prior Publication Data

US 2016/0164930 A1 Jun. 9, 2016

(51) Int. Cl.

| H04W 8/04 | (2009.01) |
|---|---|
| H04W 4/08 | (2009.01) |
| H04W 4/70 | (2018.01) |
| H04W 8/12 | (2009.01) |
| H04L 29/06 | (2006.01) |
| H04W 76/40 | (2018.01) |
| H04W 12/08 | (2009.01) |
| H04W 8/18 | (2009.01) |

(52) U.S. Cl.
CPC ...... H04L 65/403 (2013.01); H04L 29/06836 (2013.01); H04L 63/102 (2013.01); H04W 4/08 (2013.01); H04W 12/08 (2013.01); H04W 76/40 (2018.02); *H04W 8/186* (2013.01)

(58) Field of Classification Search
CPC ............. H04L 12/1818; H04L 41/0893; H04L 65/403; H04W 16/14; H04W 72/121

USPC ............... 370/260; 455/519, 414.1
See application file for complete search history.

(56) References Cited

U.S. PATENT DOCUMENTS

| 7,512,788 | B2 | 3/2009 | Choi et al. | |
|---|---|---|---|---|
| 2004/0242246 | A1* | 12/2004 | Lee | H04L 51/38 455/466 |
| 2012/0011273 | A1* | 1/2012 | Van Elburg | H04L 65/1073 709/238 |
| 2013/0148607 | A1* | 6/2013 | Yu | H04W 8/186 370/329 |

(Continued)

FOREIGN PATENT DOCUMENTS

| WO | 2014002351 A1 | 1/2014 |
|---|---|---|
| WO | 2014003750 A1 | 1/2014 |

(Continued)

*Primary Examiner* — Khaled M Kassim
*Assistant Examiner* — Jason A Harley
(74) *Attorney, Agent, or Firm* — Duft & Bornsen, PC

(57) ABSTRACT

Embodiments described herein provide usage authorization control for group communications. In one embodiment, a network element identifies a group communication for an end user of User Equipment (UE), and identifies a group ID for the group communication. The network element retrieves a user profile of the end user from a Home Subscriber Server (HSS), and determines from the user profile and the group ID whether the end user is a member of the group. The network element provides, on the condition that the end user is a member of the group, the group ID to the HSS and receives group usage rules for the group from the HSS. The network element allows the group communication on the condition that the group communication is permitted by one or more of the group usage rules.

20 Claims, 5 Drawing Sheets

(56) References Cited

U.S. PATENT DOCUMENTS

2013/0237184 A1* 9/2013 Cattan .................. H04W 24/02
455/406
2016/0007138 A1* 1/2016 Palanisanny ............ H04W 4/50
455/41.2

FOREIGN PATENT DOCUMENTS

WO 2014046686 A1 3/2014
WO 2014049418 A1 4/2014

* cited by examiner

USAGE AUTHORIZATION CONTROL FOR GROUP COMMUNICATIONS IN A COMMUNICATION NETWORK

FIELD OF THE INVENTION

The invention is related to the field of mobile communication technology.

BACKGROUND

A 3G/4G network provides end users with mobile data services utilizing User Equipment (UE) such as smartphones, laptops, tablets, and smart watches. For example, an end user may utilize a UE to engage in sessions with the 3G/4G network in order to send/receive group communications with other end users. Group communications may include group voice calls, group Short Message Service (SMS) messages, group multimedia messages, etc.

With the rise in popularity of group messaging services, problems can arise in ensuring that the senders of group communications, the receivers of group communications, or both, are authorized to participate in the group communications. The result may be the rise in unsolicited or unauthorized group communications being serviced by the 3G/4G network, which may impact the performance of the 3G/4G network. Further, users of the network may be unable to utilize group communication services due to unwanted spam.

SUMMARY

Embodiments described herein provide usage authorization control for group communications utilizing user profile information stored by a Home Subscriber Server (HSS) and group usage rules stored at the HSS. When a group communication for an end user of UE is identified, the IMS network identifies a group ID for the group communication, and utilizes the group ID to determine if the user profile indicates whether the end user is a member of the group. If the end user is a member, then the IMS network identifies group usage rules stored at the HSS for the group communication, and determines whether to allow the group communication based on the group usage rules.

In an embodiment, a network element configured to identify a group communication for an end user of User Equipment (UE), and to identify a group ID for the group communication. The network element is configured to retrieve a user profile of the end user from a Home Subscriber Server (HSS), and to determine from the user profile and the group ID whether the end user is a member of the group. The network element is configured to provide, on the condition that the end user is a member of the group, the group ID to the HSS and receive group usage rules for the group from the HSS, and to allow the group communication on the condition that the group communication is permitted by one or more of the group usage rules In an embodiment, the network element is configured to determine that the end user is a member of the group responsive to identifying that the group ID is included in the user profile.

In an embodiment, the network element is configured to determine that the end user is a member of the group on the condition that the group ID is included in the user profile.

In an embodiment, the network element is configured to reject the group communication for the end user on the condition that the group ID of the end user is missing from the user profile.

In an embodiment, the network element is configured to use the group ID to identify members of the group from the user, and to forward the group communication to UEs of the identified members.

In an embodiment, the group communication comprises a Mobile Terminated (MT) group communication, wherein the end user is a receiving end user, the network element is configured to identify an originating end user for the MT group communication, and the network element is configured to exclude the receiving end user from the MT group communication on the condition that the user profile of the receiving end user and the group ID indicate that the originating end user is not a member of the group.

In an embodiment, the group usage rules define at least one of a type of service authorized for the group communication and an allowable content for the group communication.

In an embodiment, the group usage rules define at least one of a time at which the group communication is allowed to be sent by the end user and a time at which the group communication is allowed to be received by the end user.

In an embodiment, the group usage rules define at least one of whether the end user is permitted generate a Mobile Originated (MO) group communication and whether the end user is permitted receive a Mobile Terminated (MT) group communication.

Another embodiment is a method for usage authorization control for group communications. The method comprises identifying, by a network element, a group communication for an end user of UE, and identifying, by the network element, a group ID for the group communication. The method comprises querying, by the network element, an HSS for a user profile for the end user, and processing, by the network element, the user profile using the group ID to determine whether the end user is a member of the group. The method comprises, performing, on the condition that the end user is a member of the group, the steps of querying, by the network element, the HSS with the group ID for group usage rules for the group, and determining, by the network element, whether to allow the group communication based on the group usage rules.

Another embodiment comprises a terminating network element that is configured to identify an originating end user of a Mobile Terminated (MT) group communication directed to a receiving end user, and to identify a group ID for the group communication. The terminating network element is configured to allow the MT group communication only on the condition that group usage rules provided by a Home Subscriber Server (HSS) indicate that the receiving end user and the originating end user are members of a group identified by the group ID.

Other example embodiments may be described below.

DESCRIPTION OF DRAWINGS

Some embodiments are now described, by way of example only, and with reference to the accompanying drawings. The same reference number represents the same element or the same type of element on all drawings.

DESCRIPTION OF EMBODIMENTS

The figures and the following description illustrate specific example embodiments. It will thus be appreciated that those skilled in the art will be able to devise various arrangements that, although not explicitly described or shown herein, embody the principles of the disclosure and are included within the scope of the claimed invention(s). Furthermore, any examples described herein are intended to aid in understanding the principles of the described embodiments, and are to be construed as being without limitation to such specifically recited examples and conditions. As a result, the disclosure is not limited to the specific embodiments or examples described below, but by the claims and their equivalents in view of the following description.

Figure 1:
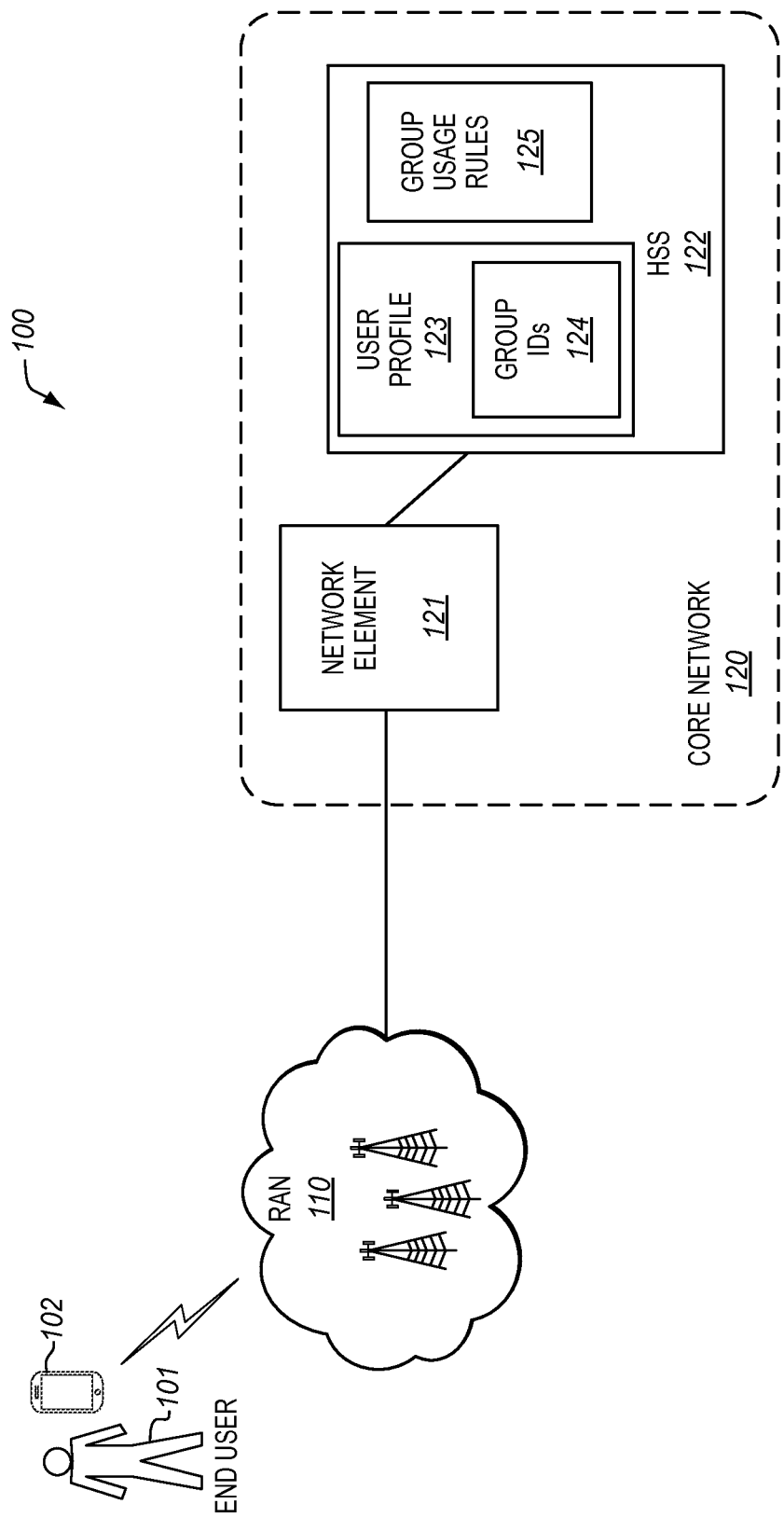
FIG. 1 illustrates a communication system in an example embodiment.

FIG. 1 illustrates a communication system 100 in an example embodiment. Communication system 100 may represent a Long Term Evolution (LTE) network (e.g., an Evolved Packet Core (EPC) network) or another type of Second Generation (2G), Third Generation (3G), Fourth Generation (4G), or later generation communication network. Communication system 100 includes a Radio Access Network (RAN) 110 and a core network 120. RAN 110 and core network 120 provide mobile communication service to end user 101 utilizing devices, such as UE 102. Core network 120 establishes and maintains sessions for UE 102 for end user 101 to allow UE 102 to access data services. UE 102 may be a mobile terminal, such as a mobile phone, a computer, a tablet, etc. UE 102 is able to access core network 120 through RAN 110, which comprises any type of network that interfaces UEs with core network 120. Some examples of RAN 110 are a UMTS Terrestrial Radio Access Network (UTRAN), an enhanced UTRAN (E-UTRAN), an Interworking-Wireless Local Area Network (I-WLAN), etc. In this embodiment, core network 120 provides group communications to UE 102. The group communications may include a group Voice over IP (VOIP) call, a group multimedia message, a group SMS message, etc.

In this embodiment, core network 120 includes a network element 121 that is coupled to an HSS 122. Network element 121 may include a Mobile Management Entity (MME), a serving GPRS support node (SGSN), a Mobile Switching Center (MSC), a Short Message Service Center (SMSC), an Application Server (AS), a Call Session Control Function (CSCF), an IP Short Message Gateway (IP-SM-GW), etc.

HSS 122 in this embodiment stores a user profile 123 for end user 101. User profile 123 includes one or more group IDs 124. Group IDs 124 are used to indicate to which communication groups end user 101 and/or UE 102 belong, if any. For instance, if end user 101 belongs to a SMS group associated with users X, Y, and Z, then user profile 123 may define (via group IDs 124) that end user 101 and users X, Y, and Z belong to a particular group ID for group SMS communications. Using the group ID, network element 121 is able to ensure that authorization and usage control policies can be applied whenever end user 101 attempts to send group communications to, or receive group communications from, the group.

HSS 122 in this embodiment stores group usage rules 125. The group usage rules 125 may also be stored in another network element or a standalone device. In this embodiment, group usage rules 125 define various criteria for allowing/rejecting the group communication for end user 101. For instance, group usage rules 125 may specify criteria for allowing/rejecting SMS group messages sent by/sent to, end user 101.

During operation, network element 121 may operate as a Mobile Originating (MO) network element in communication system 100 or as a Mobile Terminating (MT) network element in communication system 100. Network element 121 may operate as a MO network element when end user 101 utilizes network element 121 to send group communications to members of the group, while network element 121 may operate as a MT network element when other members in the group send group communications to end user 101. Network element 121 generally includes any component, system, or device that is able to implement authorization and usage control policies for group communications for end user 101 utilizing group IDs 124 and/or utilizing group usage rules 125.

In FIG. 1, assume for the purpose of discussion that UE 102 registers with communication system 100 in order to participate in group communication services provided by communication system 100.

Figure 2:
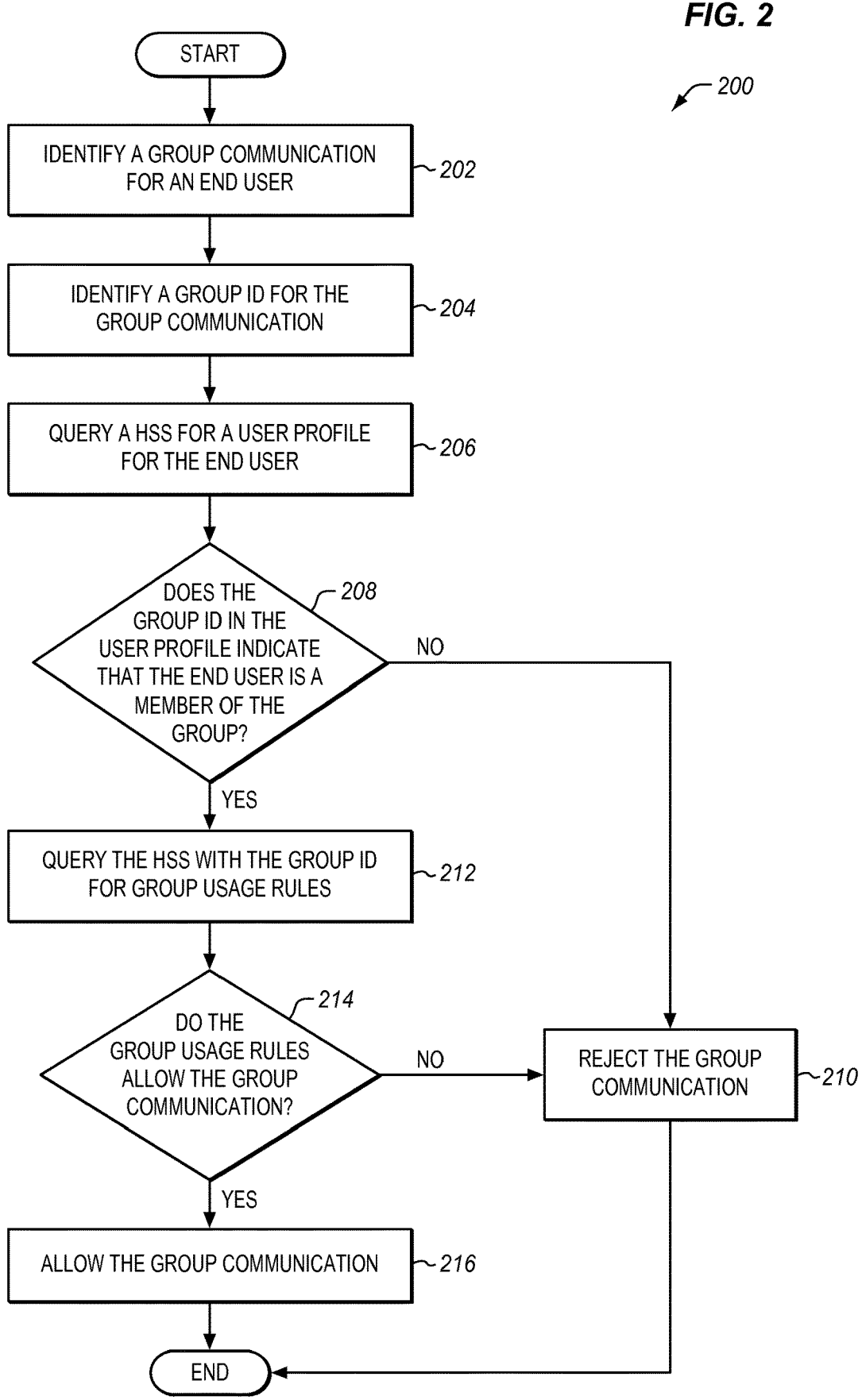
FIG. 2 is a flow chart illustrating a method for usage authorization control of group communications in an example embodiment.

FIG. 2 is a flow chart illustrating a method 200 for usage authorization control of group communications in an example embodiment. The steps of method 200 will be described with reference to communication system 100 in FIG. 1, although method 200 may be performed in other networks or systems. Methods described by the flow charts presented herein may include other steps omitted for clarity. The steps may also be performed in an alternative order.

Network element 121 identifies a group communication for end user 101 (step 202 of FIG. 2). The group communication may be, e.g. a MO group communication or a MT group communication. Network element 121 identifies a group ID for the group communication (step 204). For instance, if the group communication is an SMS message, then network element 121 may process the SMS message to retrieve the group ID from the SMS message. Network element 121 queries HSS 122 for user profile 123 for end user 101 (step 206). Network element 121 determines if user profile 123 indicates that end user 101 is a member of the group (step 208). For example, network element 121 may determine if any of group IDs 124 in user profile 123 match the group ID identified in the group communication. As end user 101 may be part of multiple groups, user profile 123 may include any number of group IDs 124.

If end user 101 is not a member of the group (e.g., the group ID does not match any of group IDs 124 in user profile 123), then network element 121 rejects the group communication (step 210). This ensures that end user 101 does not receive or send group communications to the group unless end user 101 is a member of the group.

If user profile 123 does indicate that end user 101 is a member of the group (e.g., user profile 123 does include a match for the group ID for the group communication), then network element 121 queries HSS 122 with the group ID of the group communication for group usage rules 125 associated with the group ID (step 212). Network element 121 determines whether to allow the group communication based on group usage rules 125 (step 214). If group usage rules 125 for the group ID do not allow the group communication, then network element 121 rejects the group communication (step 210). However, if group usage rules 125 for the group ID allow the group communication, then network element 121 allows the group communication (step 216).

Some examples of group usage rules 125 include which type of service is authorized for group communications. For instance, SMS services may be allowed for group communications, while VoIP services may be denied.

Another example of group usage rules 125 is the allowable content for group communications. For example, Hyper Text Transfer Protocol (HTTP) links may not be allowed in group communications, specific key words may not be allowed in group communications, embedded pictures may not be allowed in group communications, etc.

Another example of group usage rules 125 is a time at which group communications are allowed to be sent by end user 101. For instance, group usage rules 125 may define that group communications may only be sent by end user 101 during work hours, may define that group communications may only be sent by end user 101 on specific days, etc.

Another example of group usage rules 125 is a time at which group communications are allowed to be received by end user 101. For instance, group usage rules 125 may define that group communications may only be received by end user 101 during work hours, may define that group communications may only be received by end user 101 on specific days, etc. This type of rule may be used in cases whereby group communications are queued for delivery at a time that is different than when the group communications were originally generated. For instance, an automated system may attempt to generate SMS messages for end user 101 outside of business hours, which may be rejected based on group usage rules that define that group communications are only allowed for end user 101 during business hours.

Another example of group usage rules 125 is whether end user 101 may generate MO group communications. For instance, end user 101 may be allowed to send group communications but not to receive group communications. This type of rule may be useful in cases where it is important to allow end user 101 to notify the group of specific events, while preventing end user 101 from receiving a number of irrelevant communications from the group.

Another example of group usage rules 125 is whether end user 101 may receive MT group communications. For instance, end user 101 may be allowed to receive group communications but not to send group communications. This type of rule may be useful in cases where end user 101 is part of a distribution group that does not allow members to send group communications to other members in the group.

Utilizing group IDs 124 and group usage rules 125, network element 121 is able to ensure that group communications can be authenticated and the usage of group communications can be controlled by core network 120. For instance, if an entity attempts to send group communications to end user 101 and end user 101 is not participating in the specific group that the group communication relates to, then network element 121 is able to reject the group communication for end user 101. This may reduce spam group communications that may be sent to end user 101, and also may reduce the network load on core network 120. In the converse, if end user 101 attempts to send group communications to other end users (not shown) and end user 101 does not participate in the specific group that a group communication relates to, then network element 121 is able to reject the group communication for end user 101. This may reduce spam group communications that may be sent from end user 101 to the group, and also may reduce the network load on core network 120.

In some embodiments, the group communication may be a MO group communication sent by end user 101 to the group. In this case, network element 121 may process user profile 123 for end user 101 to identify other members associated with the group ID, and forward the group communication to the other members in the group. For instance, an entry in user profile 123 for end user 101 may include not only the group ID for a particular group, but also include routable destinations (e.g., telephone numbers) for the other members in the group. This may allow network element 121 to distribute MO group communications to other members associated with the group communication.

In some embodiments, the group communication may be a MT group communication that is received by end user 101 from the group. In this case, network element 121 may not be involved in the MO processing for the group communication. For instance, a MT group communication may arrive from a foreign network.

Figure 3:
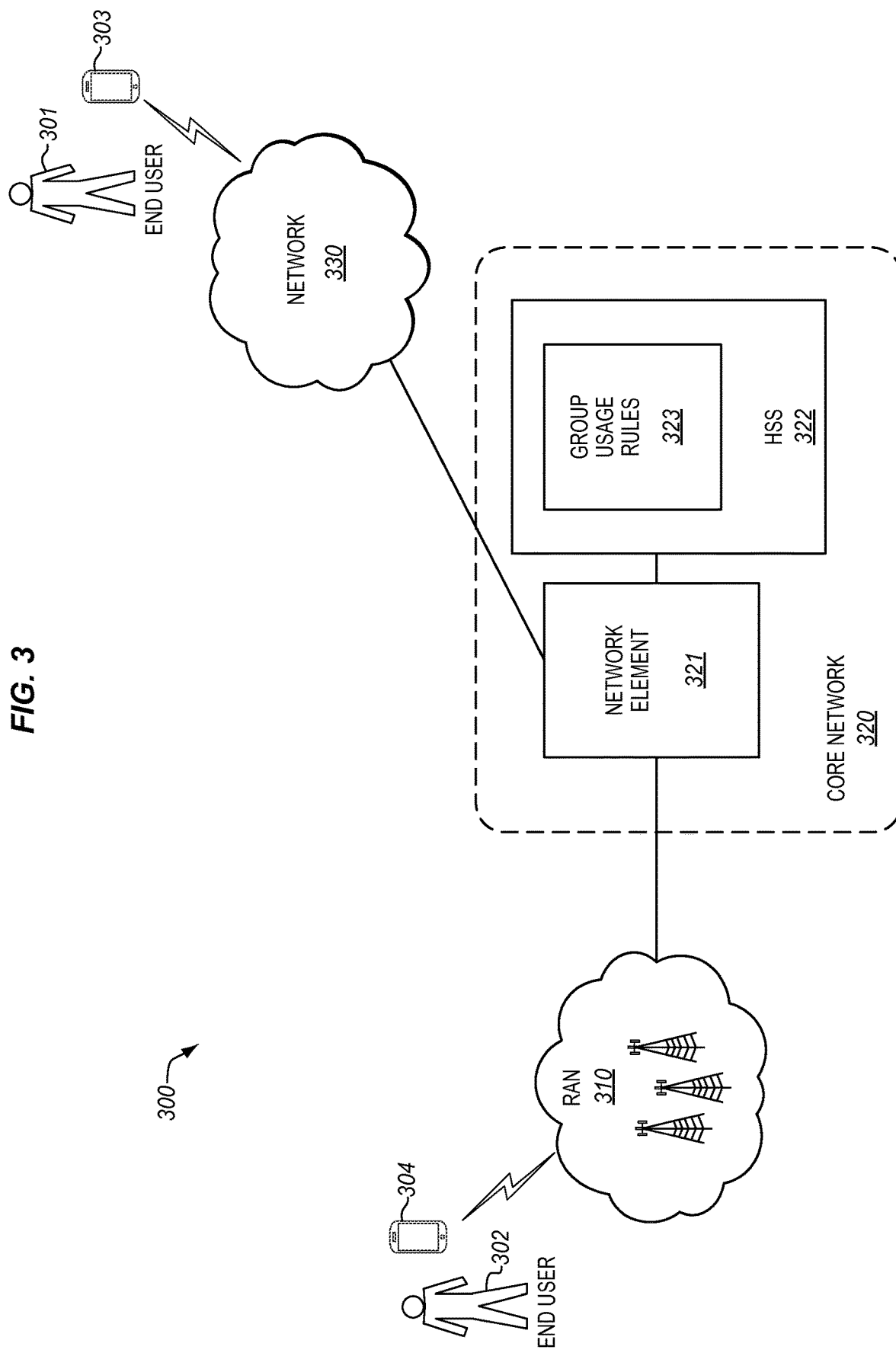
FIG. 3 illustrates another communication system in an example embodiment.

FIG. 3 illustrates another communication system 300 in an example embodiment. Communication system 300 may represent an LTE network (e.g., an EPC network) or another type of 2G, 3G, 4G, or later generation communication network. Communication system 300 includes a Radio Access Network (RAN) 310 and a core network 320. RAN 310 and core network 320 provide mobile communication service to end user 302 utilizing devices, such as UE 304. Core network 320 establishes and maintains sessions for UE 304 for end user 302 to allow UE 304 to access data services. In this embodiment, core network 320 provides MT group communications to UE 102. The MT group communications may include a MT group VOIP call, a MT group multimedia message, a MT group SMS message, etc.

In this embodiment, core network 320 includes a network element 321 that processes MT group communication for end user 302. Network element 321 is coupled to an HSS 322. Network element 321 may include a MME, a SGSN, a MSC, a SMSC, an Application Server (AS), a CSCF, an IP-SM-GW, etc.

HSS 322 in this embodiment stores a user profile 323 for end user 302 and group IDs 324. Both user profile 323 and group IDs 324 may be similar to the user profile 123 and group IDs 124 previously described for FIG. 1. HSS 322 also stores group usage rules 323, which may be similar to the group usage rules 125 previously described for FIG. 1.

In this embodiment, network element 321 of core network 320 is coupled with a network 330 that provides access to end user 301 via UE 303 for sending group communications to end user 302.

Assume for the purpose of discussion for this embodiment that end user 301 utilizes UE 303 to generate a MT group communication for end user 302. The MT group communication is forwarded by network 330 to network element 321 for processing. Further assume for the purpose of discussion that the network 330 is a foreign network, e.g. a network located outside the jurisdictional boundaries of the core network 320. The MT group communication may be a Mobile Terminated SMS message (MT-SMS), a Mobile Terminated Call (MTC), a Mobile Terminated MultiMedia Message (MT-MMS), etc.

Figure 4:
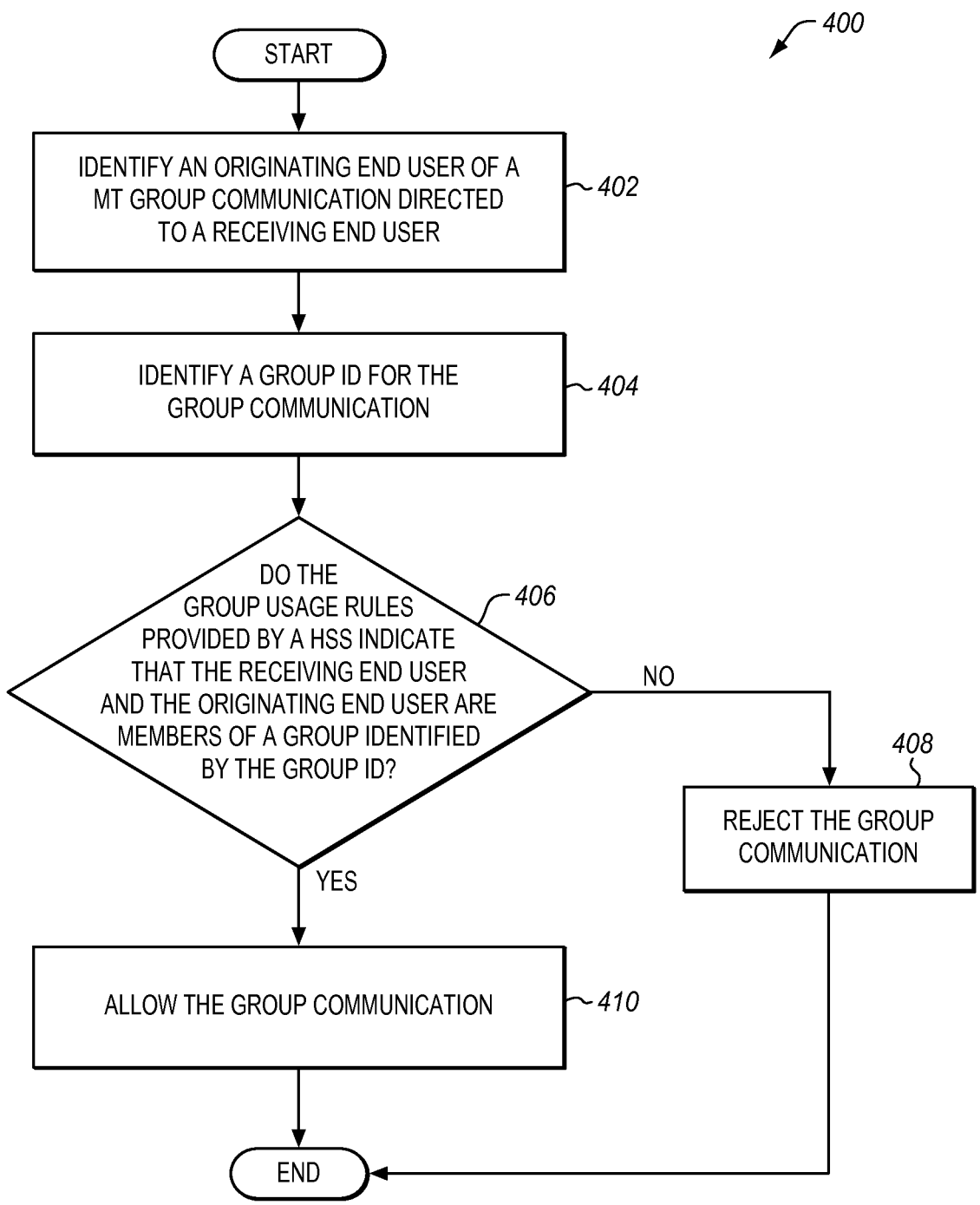
FIG. 4 is a flow chart illustrating a method for usage authorization control of Mobile Terminated (MT) group communications in an example embodiment.

FIG. 4 is a flow chart illustrating a method 400 for usage authorization control of Mobile Terminated (MT) group communications in an example embodiment. The steps of method 400 will be described with reference to communication network 300 in FIG. 3, although method 400 may be performed in other networks or systems.

Network element 321 identifies an originating end user (e.g., user 301) of a MT group communication directed to a receiving end user (e.g., user 302; step 402 of method 400).

Network element 312 may process the MT group communication to identify an ID or phone number associated with UE 303.

Network element 321 identifies a group ID for the MT group communication (step 406). The Group ID may be included in headers, signaling, etc., for the MT group communication. Network element 321 determines if group usage rules 323 provided by HSS 322 indicate that the receiving end user (e.g., user 302) and the originating end user (e.g., user 301) are members of a group identified by the group ID (step 406). If the receiving end user and the originating end user are members of the group, then network element 321 allows the group communication (step 410). If either the receiving end user or the originating end user is not a member of the group, then network element 321 rejects the group communication (step 408).

Example

Figure 5:
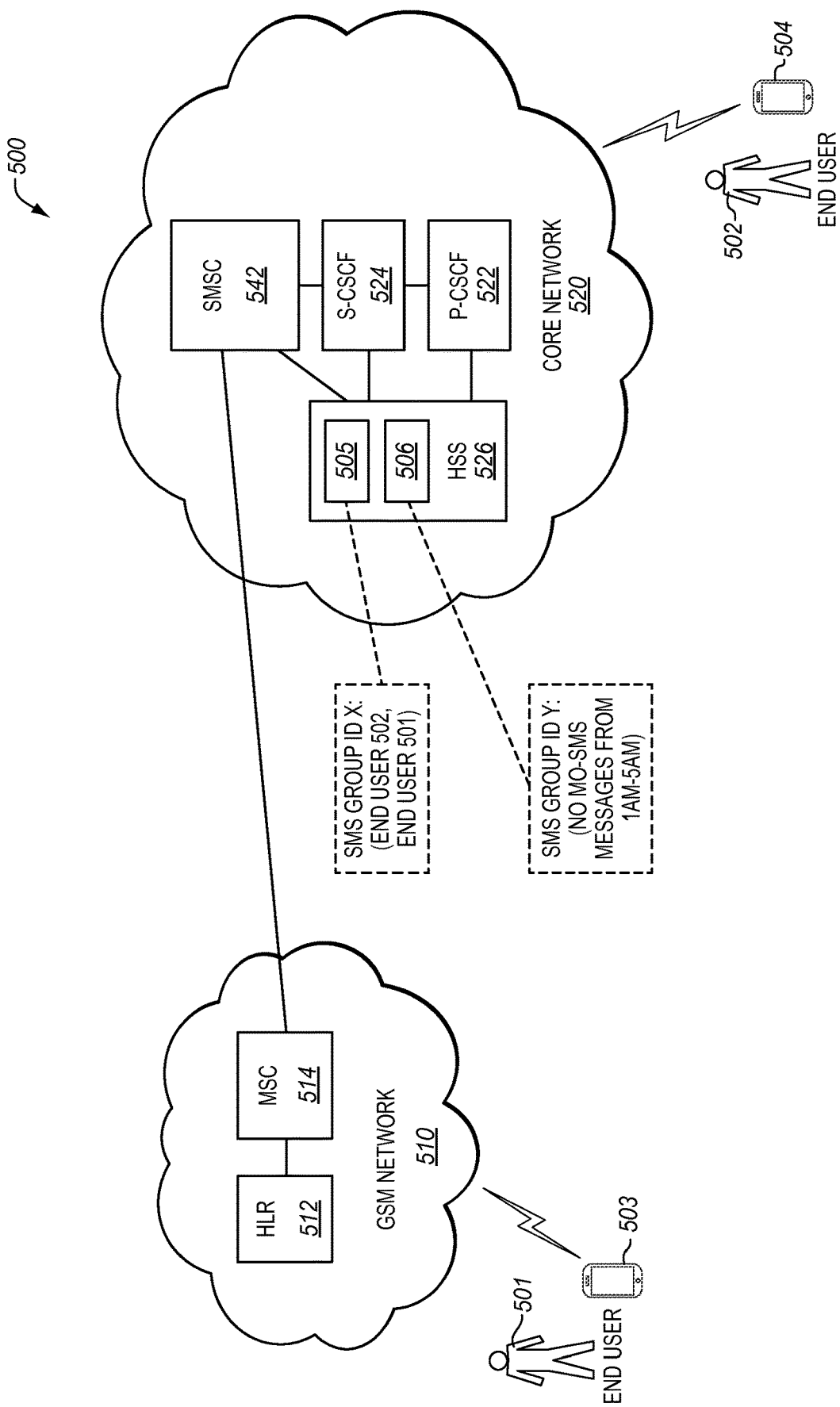
FIG. 5 illustrates another communication system in an example embodiment.

FIG. 5 illustrates a communication system 500 in an example embodiment. Communication system 500 includes multiple communication networks, which are illustrated as GSM network 510 and core network 520 in this embodiment. GSM network 510 includes a Home Location Register (HLR) 512 and a Mobile Switching Center (MSC) 514. HLR 512 is a central subscriber database that stores subscription information and other details (e.g., subscriber profiles) of mobile devices (e.g., UE 503 for end user 501) that are authorized to use GSM network 510. MSC 514 is the serving node for mobile devices, and is responsible for handling voice calls, SMS, and other services in GSM network 510.

Core network 520 includes a Proxy-Call Session Control Function (P-CSCF) 522, a Serving-Call Session Control Function (S-CSCF) 524, and a Home Subscriber Server (HSS) 526. P-CSCF 522 is the entry point to the IMS domain and serves as the outbound proxy server for IMS devices (e.g., UE 504 for end user 502). S-CSCF 524 is the central node of the signaling plane, and performs session control for devices that initiate sessions over core network 520. S-CSCF 524 communicates with devices over one or more access networks that are not shown in FIG. 5. HSS 526 is a subscriber server that stores subscription-related information (e.g., user profiles), performs authentication and authorization of end users (e.g., end user 502), provides information about the subscriber's location, etc. In this embodiment, HSS 526 has been enhanced to store an enhanced user profile 505 for end user 502, which includes group IDs associated with communication groups. HSS 526 has further been enhanced to store group usage rules 506. Group usage rules have been previously discussed with respect to FIGS. 1-2. In this embodiment, core network 520 serves UE 504.

Core network 520 also includes SMS Center (SMSC) 542. SMSC 542 comprises any node that delivers SMS messages. SMSC 542 also includes SMS gateway functionalities to interwork signaling between networks that use a different signaling protocol. For example, if a network or device uses Short Message Peer-to-Peer (SMPP) protocol to exchange SMS messages, then SMSC 542 is able to interwork the SMPP protocol messages to SIP and vice-versa. In this embodiment, SMSC 542 has been enhanced to apply usage authorization control to group SMS communications.

Assume for the purpose of discussion for the example that end user 502 uses UE 504 to send a MO-SMS message to group X at 3 AM. SMSC 542 identifies the MO-SMS message from end user 502, and queries HSS 526 for user profile 505 for end user 502. In the example, user profile 505 has an entry for group X, which identifies that group X includes end user 501 and end user 502. SMSC 542 continues to process the MO-SMS message because end user 502 is a member of group X. If SMSC 542 had determined that end user 502 was not a member of group X (e.g., user profile 505 for end user 502 did not include an entry for group X), then SMSC 542 rejects the MO-SMS message.

SMSC 542 determines that end user 502 is a member of group X, and therefore, SMSC 542 queries HSS 526 for group usage rules 506 for group X. In the example, group usage rules 506 indicate that one of the rules for group X is that no MO-SMS messages are allow from 1 AM to 5 AM. However end user 502 generated the MO-SMS message at 3 AM in this example. SMSC 542 rejects the MO-SMS message from end user 502 due to the usage rule for group X precluding MO-SMS messages from 1 AM to 5 AM. If the MO-SMS message had been sent by end user 502 outside of the 1 AM-5 AM exclusion rule in place for group X, then SMSC 542 would allow the MO-SMS message for group X. If allowed, SMSC 542 may then identify end user 501 as a member of group X, and forward the MO-SMS message from end user 502 to MSC 514 for delivery to end user 501.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as non-transitory instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. Instead, the scope of the claimed invention(s) is determined by the following claims and any equivalents thereof in light of the preceding description.

We claim:

1. An apparatus comprising:
a network element configured to identify a group communication for an end user of User Equipment (UE), and to process the group communication to retrieve a group ID from the group communication;
the network element configured to retrieve a user profile of the end user from a Home Subscriber Server (HSS), and to determine from the user profile and the group ID whether the end user is a member of a group associated with the group ID; and the network element is configured to provide, on a condition that the end user is a member of the group, the group ID to the HSS and receive group usage rules for the group from the HSS, and to allow the group communication on the condition that the group communication is permitted by one or more of the group usage rules.

2. The apparatus of claim 1 wherein:
the network element is configured to determine that the end user is a member of the group on the condition that the group ID is included in the user profile.

3. The apparatus of claim 1 wherein:
the network element is configured to reject the group communication for the end user on the condition that the group ID of the end user is missing from the user profile.

4. The apparatus of claim 1 wherein:
the network element is configured to use the group ID to identify members of the group from the user profile, and to forward the group communication to UEs of the identified members.

5. The apparatus of claim 1 wherein:
the group communication comprises a Mobile Terminated (MT) group communication; and
wherein the end user is a receiving end user, the network element is configured to identify an originating end user for the MT group communication, and the network element is configured to exclude the receiving end user from the MT group communication on the condition that the user profile of the receiving end user and the group ID indicate that the originating end user is not a member of the group.

6. The apparatus of claim 1 wherein the group usage rules define at least one of:
a time at which the group communication is allowed to be sent by the end user;
a time at which the group communication is allowed to be received by the end user;
a type of service authorized for the group communication; and
an allowable content for the group communication.

7. The apparatus of claim 1 wherein the group communication comprises one of:
a Mobile Terminating Short Message Service message (MT-SMS);
a Mobile Originating SMS message (MO-SMS);
a Mobile Terminating Call (MT-Call);
a Mobile Originating Call (MO-Call);
a Mobile Terminating MultiMedia Message (MT-MMS); and
a Mobile Originating MultiMedia Message (MO-MMS).

8. The apparatus of claim 1 wherein the group usage rules define at least one of:
whether the end user is permitted generate a Mobile Originated (MO) group communication; and
whether the end user is permitted receive a Mobile Terminated (MT) group communication.

9. A method for usage authorization control for group communications, the method comprising:
identifying, by a network element, a group communication for an end user of User Equipment (UE);
processing, by the network element, the group communication to retrieve a group ID for from the group communication;
querying, by the network element, a Home Subscriber Server (HSS) for a user profile for the end user;
processing, by the network element, the user profile using the group ID to determine whether the end user is a member of a group associated with the group ID;
performing, on a condition that the end user is a member of the group, the steps of:
querying, by the network element, the HSS with the group ID for group usage rules for the group; and
determining, by the network element, whether to allow the group communication based on the group usage rules.

10. The method of claim 9 further comprising determining that the end user is a member of the group by identifying, by the network element, that the group ID is included in the user profile.

11. The method of claim 9 further comprising:
rejecting, by the network element, the group communication for the end user on the condition that the group ID is missing from the user profile.

12. The method of claim 9 further comprising:
processing, by the network element, the user profile using the group ID to identify members of the group; and
forwarding, by the network element, the group communication to UEs of the members.

13. The method of claim 9 wherein:
the group communication comprises a Mobile Terminated (MT) group communication and the end user is a receiving end user; and
the method further comprises:
identifying, by the network element, an originating end user for the MT group communication;
determining, by the network element, whether the originating end user is a member of the group using the user profile of the receiving end user and the group ID; and
rejecting, by the network element, the MT group communication for the receiving end user on the condition that the originating end user is not a member of the group.

14. The method of claim 9 wherein the group usage rules define at least one of:
a time at which the group communication is allowed to be sent by the end user;
a time at which the group communication is allowed to be received by the end user;
a type of service authorized for the group communication; and
an allowable content for the group communication.

15. The method of claim 9 wherein the group communication comprises one of:
a Mobile Terminating Short Message Service message (MT-SMS);
a Mobile Originating SMS message (MO-SMS);
a Mobile Terminating Call (MT-Call);
a Mobile Originating Call (MO-Call);
a Mobile Terminating MultiMedia Message (MT-MMS); and
a Mobile Originating MultiMedia Message (MO-MMS).

16. The method of claim 9 wherein the group usage rules define at least one of:
whether the end user is permitted to generate a Mobile Originated (MO) group communication; and
whether the end user is permitted to receive a Mobile Terminated (MT) group communication.

17. An apparatus comprising:
a terminating network element configured to identify an originating end user of a Mobile Terminated (MT) group communication directed to a receiving end user, and to process the group communication to retrieve a group ID from the group communication;
the terminating network element configured to allow the MT group communication only on a condition that group usage rules provided by a Home Subscriber Server (HSS) indicate that the receiving end user and the originating end user are members of a group identified by the group ID.

18. The apparatus of claim 17 wherein the group communication comprises one of:
a MT Short Message Service message (MT-SMS);
a MT Call (MT-Call); and
a MT MultiMedia Message (MT-MMS).

19. The apparatus of claim 17 wherein:
the terminating network element is configured to determine that the receiving end user and the originating end user are members of the group by obtaining a user profile from a Home Subscriber Server (HSS) and determining that the receiving end user and the originating end user are both associated with the group ID; and
the terminating network element is further configured to send, on the condition that the originating end user and the receiving end user are members of the group, the group ID toward the HSS and receive the group usage rules for the group.

20. The apparatus of claim 17 wherein the group usage rules define at least one of:
a type of service authorized for the group communication;
an allowable content for the group communication;
a time at which the group communication is allowed to be sent by the end user;
a time at which the group communication is allowed to be received by the end user;
whether the end user is permitted to generate a Mobile Originated (MO) group communication; and
whether the end user is permitted to receive a Mobile Terminated (MT) group communication.

* * * * *